R. BATTLE.
DEVICE FOR ATTACHING ELECTRIC LIGHT FIXTURES TO OUTLET BOXES.
APPLICATION FILED APR. 11, 1919.
1,351,150.
Patented Aug. 31, 1920.
2 SHEETS—SHEET 1.
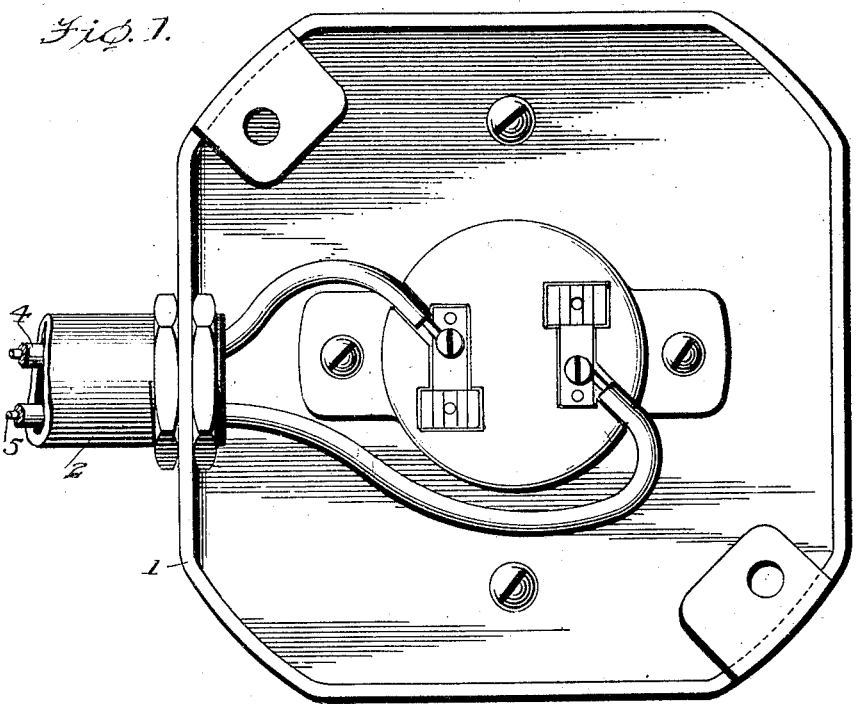
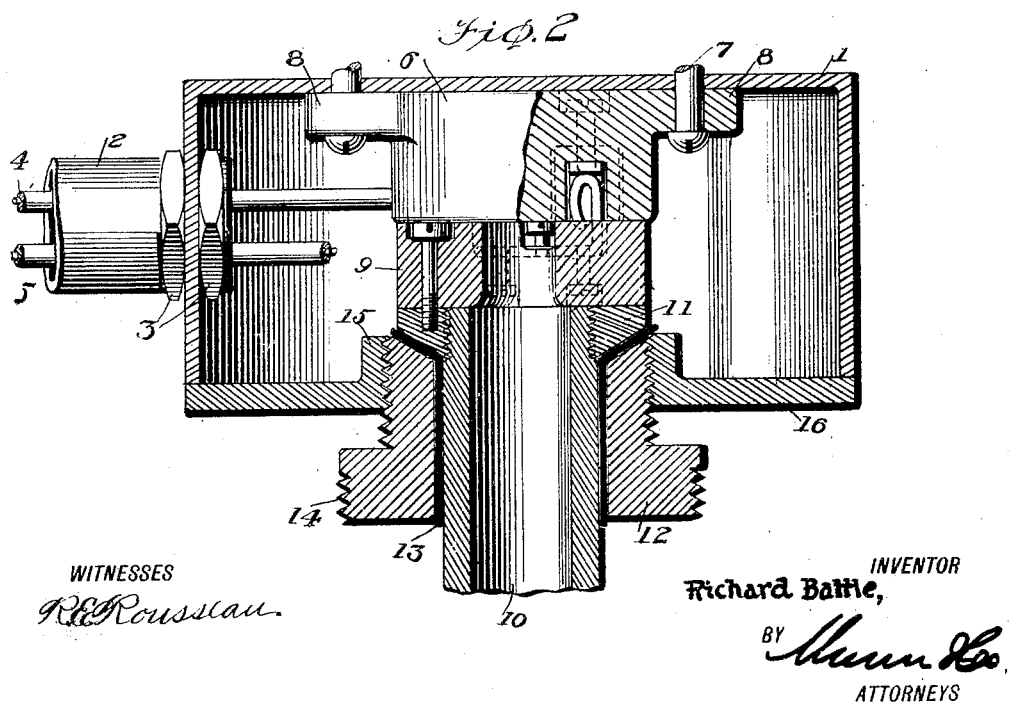
WITNESSES
INVENTOR
Richard Battle,
BY
ATTORNEYS

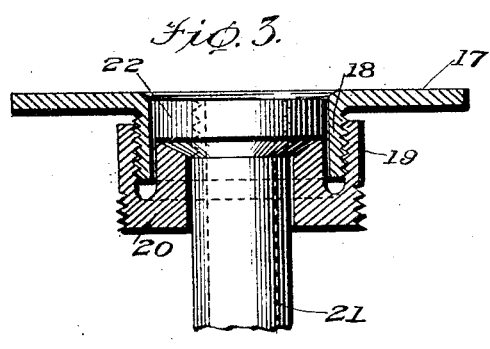
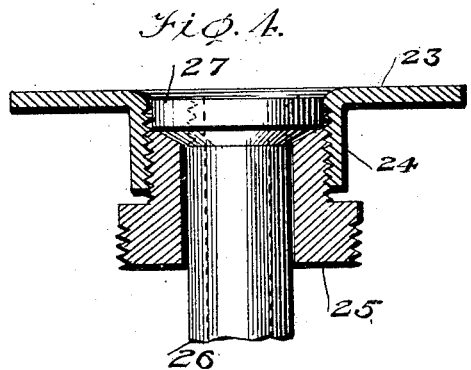
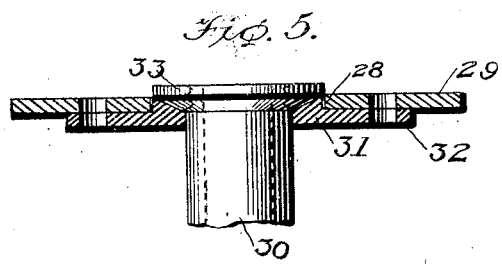
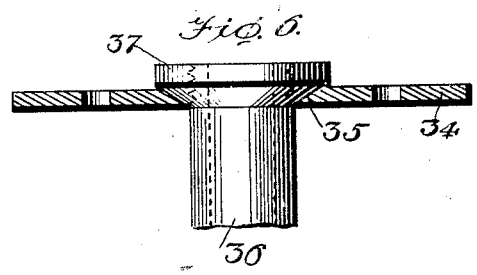
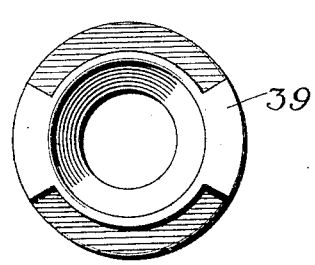
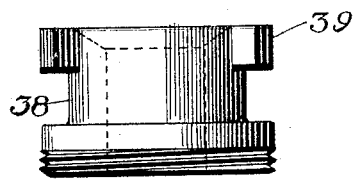

UNITED STATES PATENT OFFICE.

RICHARD BATTLE, OF OKMULGEE, OKLAHOMA.

DEVICE FOR ATTACHING ELECTRIC-LIGHT FIXTURES TO OUTLET-BOXES.

1,351,150. Specification of Letters Patent. Patented Aug. 31, 1920.

Application filed April 11, 1919. Serial No. 289,268.

*To all whom it may concern:*

Be it known that I, RICHARD BATTLE, a citizen of the United States, and a resident of Okmulgee, in the county of Okmulgee and State of Oklahoma, have made certain new and useful Improvements in Devices for Attaching Electric-Light Fixtures to Outlet-Boxes, of which the following is a specification.

My invention is an improvement in devices for attaching electric light fixtures to outlet boxes, and has for its object to provide a device of the character specified, so constructed that the fixture, as for instance a light, fan, or the like, may be readily removable for inspection, repair, interchanging, cleaning and the like, and adapted for use on either ceiling or side wall.

In the drawings:—

Figure 1 is a plan view of the base section;

Fig. 2 is a vertical section;

Figs. 3, 4, 5 and 6 are sectional views showing the application to various types of boxes;

Fig. 7 is a plan view of another form of cap;

Fig. 8 is a side view of the same.

In the embodiment of the invention shown in Figs. 1 and 2, the box 1 which is of usual construction has connected therewith at one side a conduit 2 by means of the usual lock nuts 3, and the lead wires 4 and 5 extend into the box through the conduit in the usual manner. The base section of the connection indicated at 6 is of usual form, and is secured to the bottom of the box by screws 7 which pass through the lateral lugs 8 on the connection.

The mounting section 9 of the connection is supported by the pipe connection 10, the said connection 9 being secured to a ring 11 which is threaded on to the end of the pipe connection, the said ring forming an annular rib or shoulder on the end of the connection, and the ring is of the same diameter as the mounting section 9.

The end of this ring remote from the section 9 is beveled or inclined as shown, and this end or inclined surface is adapted to contact with a bevel on the inner end of the plug, as shown in Figs. 2, 3 and 4, or on the plate, as shown in Figs. 5 and 6, and suitable insulation may be interposed between these inclined surfaces. This insulation is shown at 13 in Fig. 2. These tapered surfaces of the ring and plug insure the centering of the fixture, and the plug as shown at 14 in Figs. 2 and 3 may be externally threaded for engagement by an ornamental plate to cover the connection.

The plug 12 in Fig. 2 is threaded into a nipple 15 in the cover plate 16 of the outlet box, the said nipple extending inwardly with respect to the cover.

In Fig. 3 the cover plate 17 has an outwardly extending externally threaded nipple 18, which is engaged by an internally threaded petticoat 19 on the plug 20, and the plug is externally threaded for engagement by the ornamental plate above mentioned.

A pipe connection 21 has the collar 22 threaded thereon which is adapted to be engaged by the inner end of the plug, the collar and plug having tapering surfaces for properly centering the mounting connection which is not shown in the present instance, but is connected to the collar.

In Fig. 4 the cover plate 23 has an outwardly extending internally threaded nipple 24, which is engaged by the plug 25. The pipe connection 26 has the collar 27 threaded thereon, the engaging faces of the collar and the plug being tapered in the same manner as shown in Figs. 2 and 3. The plug is externally threaded in the same manner as the plugs 12 and 20.

In Fig. 5 opening 28 of the cover plate 29 through which the pipe connection 30 is to pass receives also an annular rib 31 on a plate 32, which fits upon the cover plate and is secured thereto. The collar 33 corresponding to the collar 11 of Fig. 2 is engaged by the rib 31 and this collar and rib having tapering engaging faces. As shown the plates 29 and 32 have registering openings for receiving securing means.

In Fig. 6 the cover plate 34 has an opening 35 which is of a diameter to permit the passage of the pipe connection 36, but which is smaller than the external diameter of the collar 37 threaded on to the pipe connection.

The inner wall of the opening 35 is beveled as shown to fit the taper of the collar and the plate 34 has openings for receiving the securing means. In this instance the collar is engaged directly by the plate 34.

In Figs. 7 and 8, the plug 38, which is similar to the plug 12 of Fig. 2 instead of having threaded engagement with the cover plate, is held in place by radial lugs 39. It will be noticed referring to Figs. 7 and 8, that the inner end of this plug is beveled or tapered in the same manner as plug 12, and for the same purpose.

When hanging a fixture the connection 9 supported by the mounting is thrust home and the plug, cap or plate, as the case may be, is screwed up so that the fixture is held in place. Should the connections at any time become loosened they may be tightened by merely turning the plug.

I claim:—

1. In combination with an outlet box having a cover plate, a pipe connection, a plug and a sectional electrical connection for an electric lighting fixture, one of said sections being secured to the box and the other being supported by the mounting for the fixture, of a collar on the inner end of the pipe connection to which the section is connected, the plug having threaded engagement with the cover for the outlet box, and engaging the collar at its inner end, said plug and collar having coöperating tapering engaging surfaces for the purpose specified.

2. In combination with an outlet box having a cover plate, a pipe connection, a plug and a sectional electrical connection for an electric lighting fixture, one of said sections being secured to the box and the other being supported by the mounting for the fixture, of a collar on the inner end of the pipe connection to which the section is connected, the plug having threaded engagement with the cover for the outlet box, and engaging the collar at its inner end.

3. In combination with an outlet box having a cover plate, a pipe connection, a plug and a sectional electrical connection for a light fixture, one section being secured to the box and the other being supported by the pipe, of a collar on the inner end of the said connection to which the section is connected, the plug made rotatable on the pipe connection and having a detachable engagement with the cover plate and engaging the collar at its inner end, said connection being a threaded connection.

4. In combination with an outlet box having a cover plate, a pipe connection, a plug and a sectional electrical connection for a light fixture, one section being secured to the box and the other being supported by the pipe, of a collar on the inner end of the said connection to which the section is connected, the plug made rotatable on the pipe connection and having a detachable engagement with the cover plate and engaging the collar at its inner end, the meeting ends of the section and the plug being tapered to fit one within the other.

5. In combination with an outlet box having a cover plate, a pipe connection, a plug and a sectional electrical connection for a light fixture, one section being secured to the box and the other being supported by the pipe, of a collar on the inner end of the said connection to which the section is connected, the plug made rotatable on the pipe connection and having a detachable engagement with the cover plate and engaging the collar at its inner end.

RICHARD BATTLE.

Witnesses:
 ROBT. M. ISHAM,
 CAREY E. VAIL.